United States Patent
Britton

(10) Patent No.: US 6,314,925 B1
(45) Date of Patent: *Nov. 13, 2001

(54) TWO-STROKE INTERNAL COMBUSTION ENGINE WITH RECUPERATOR IN CYLINDER HEAD

(76) Inventor: Richard Berkeley Britton, P.O. Box 7451, Charlottesville, VA (US) 22906

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/110,746

(22) Filed: Jul. 3, 1998

Related U.S. Application Data

(60) Provisional application No. 60/051,714, filed on Jul. 3, 1997.

(51) Int. Cl.[7] .............................. F02B 33/22; F02G 5/02; F01K 23/04
(52) U.S. Cl. ...................... 123/70 R; 123/543; 123/52.5; 60/604
(58) Field of Search .................................. 123/70 R, 543, 123/547, 553, 295, 299, 300, 52.3, 52.5, 48 D, 79 C; 60/620, 604

(56) References Cited

U.S. PATENT DOCUMENTS

| | | | |
|---|---|---|---|
| 155,087 | 9/1874 | Hirsch | 60/12 X |
| 328,970 | 10/1885 | Place | 123/68 |
| 642,176 | 1/1900 | Thomson | 123/1 R |
| 870,720 | 11/1907 | Frith | 60/620 |
| 1,111,841 | 9/1914 | Koenig | 123/68 |
| 1,904,070 | 2/1933 | Morgan | 60/620 |
| 3,675,630 * | 7/1972 | Stratton | 123/70 R |
| 4,040,400 | 8/1977 | Keiner | 123/68 |
| 4,074,533 | 2/1978 | Stockton | 60/620 |
| 4,133,172 | 1/1979 | Cataldo | 60/39.63 |
| 4,333,424 * | 6/1982 | McFee | 123/68 |
| 4,630,447 | 12/1986 | Webber | 60/712 |
| 4,715,326 | 12/1987 | Thring | 123/3 |
| 4,781,155 | 11/1988 | Brucker | 123/70 V |
| 4,928,658 * | 5/1990 | Ferrenberg et al. | 123/543 |
| 5,050,570 | 9/1991 | Thring | 123/556 |
| 5,085,179 | 2/1992 | Faulkner | 123/70 R |
| 5,228,415 | 7/1993 | Williams | 123/51 R |
| 5,499,605 | 3/1996 | Thring | 123/70 R |
| 5,782,215 * | 7/1998 | Engelmann | 123/79 C |
| 5,857,436 * | 1/1999 | Chen | 123/70 R |
| 5,927,244 * | 7/1999 | Yamauchi et al. | 123/295 |

\* cited by examiner

Primary Examiner—Tony M. Argenbright
Assistant Examiner—Arnold Castro
(74) Attorney, Agent, or Firm—Daniel M. Schaeffer

(57) ABSTRACT

A Recuperative Cycle tow-stroke internal combustion engine having an expander cylinder with an open combustion chamber in its working end and a separate compressor for injecting a compressed air charge into the chamber obtains improved Carnot efficiency by the containment of all its working components in a new and novel cylinder head. This head captures thermal energy normally thrown away in engine exhaust and transfers it advantageously back into the working cycle. The result, long sought by others, has been achieved by incorporating compactly within the head an internal exhaust heat recuperator or heat exchanger closely coupled with a combustion chamber open to the expansion cylinder. A recuperator-protecting valve isolates the recuperator from hot combustion gases until they have been cooled by full piston expansion and a catalytic convertor may be placed in an optimum temperature position within the recuperator chamber. A prototype has demonstrated that the recuperation can reduce exhaust temperature by as much as 600° Rankine below that attainable in an equivalent Otto Cycle engine. The displacement ratio between compressor cylinder and expander cylinder may be optimized during design, such as with a 6:1 compression ratio and a 15:1 expansion ratio, and this feature in combination with the open combustion chamber and the ability to operate the compressor with a phase lead over the expander enables the efficiency to be as much as one-third higher than in an Otto Cycle engine. Recuperators of both common-duct and separated-duct design are described, the latter embodiment being preferred as it provides cleaner burning and a reduction in the number of valves necessary to control gas flow.

28 Claims, No Drawings

TWO-STROKE INTERNAL COMBUSTION ENGINE WITH RECUPERATOR IN CYLINDER HEAD

REFERENCE TO OTHER APPLICATIONS

This utility application claims the benefit of U.S. Provisional Patent Application 60/051714 filed Jul. 3, 1997 and entitled: RECUPERATIVE INTERNAL COMBUSTION ENGINE CYCLE AND MECHANISM.

This application is being filed together with related utility patent application Ser. No. 09/110,747 entitled: RECUPERATIVE INTERNAL COMBUSTION ENGINE WITH SINGLE PISTON.

BACKGROUND OF THE INVENTION

1. Field Of The Invention

This invention relates to piston-type internal combustion engines having a combustor/expander cylinder, a separate compressor, and an exhaust heat recuperator means which preheats the compressed air charge. The invention relates further to an engine having a recuperator and a recuperator-protective valve to protect the recuperator from the combustion process.

2. Description Of The Related Art

Internal combustion engines today, with the exception of Diesels, operate on what is commonly known as an Otto cycle originally patented in France in 1862 by Alphonse Beau de Rochas. In 1876, the Rochas compression cycle was incorporated into a practical engine by Nicholas A. Otto. Otto engines were immediately more efficient than Lenoir non-compressing gas engines which had been in production since 1862. Then in 1892, Rudolf Diesel invented the compression ignition engine with higher efficiency than an Otto engine. At the time, their efficiencies were about 3 to 4% for the Lenoir, 12% for the Otto, and 24% for the Diesel, and compared with their expansion ratios of approximately 1.5: 1, 2.5:1, and 16:1.

The low efficiencies are related to the large amount of energy remaining in the engine exhaust at the moment of release by the exhaust valve. Exhaust temperatures for example of 1,450° Fahrenheit or more were reported for the Lenoir and Otto, and around 900° F. for the Diesel. Actual gas temperatures inside the cylinders when expansion was complete were surely much higher. This is because a great deal of exhaust gas heat transfers to the exhaust valve and then to the exhaust port walls. For example, gas reaches about 90% equilibrium with wall temperature after flowing only ten diameters along the length of a straight pipe. In early engines, exhaust valves and exhaust ports were labyrinthine in design and thus much of the heat from the exhaust was absorbed by these parts before the exhaust exitted the engine.

The better efficiency of the Diesel came about due to its very high expansion ratio, a result of the high compression ratio needed to create high temperature (generally greater than 550° F.) sufficient to auto-ignite the injected fuel. The high compression ratio and attendant gas and bearing pressures required greatly increased strength and with it, increased weight and cost. In fact, the Diesel is two to three times the weight and cost of a comparable Otto engine.

The first recuperative internal combustion engine of the prior art appears to be U.S. Pat. No. 4,155,087 issued on Sep. 15, 1874 to Joseph Hirsch. The described engine has two cylinders interconnected by a regenerator made of refractory elements. Because the heat exchanger is located in an external duct also made of refractory material, the heat exchanger continuously radiates away thermal energy. Hot exhaust gas from the "hot-air" cylinder, after passage through the heat exchanger, passes into the "cold-air" cylinder. When heated exhaust gas is in the cold-air cylinder, water is injected to cool and reduce the volume of the gas in the cold-air cylinder. Additional make-up air is then added under pressure and the gas volume is finally transferred to the hot-air cylinder via the heat exchanger. Utilization of the thermal energy in the exhaust is far from optimum as a consequence of lowering the temperature of the charge before transfer to the hot-air cylinder by way of the heat exchanger. Taking the radiation and convection heat losses from the heat exchanger into account, it is difficult to see how the device can effect an appreciable increase in the Carnot efficiency.

U.S. Pat. No. 328,970 issued Oct. 27, 1885 to James F. Place describes an engine having a compression-cylinder and a power-cylinder arranged in a vee, their cylinder heads connected by a regenerative means for the capture of exhaust heat. A cylindrical, internally finned, dual purpose recuperator valve of the type that is usually oil lubricated and sealed was located in the power cylinder head. This valve captured heat as it released exhaust gas and transferred the heat to the compressed charge passed back through the valve to the power-cylinder. Such a recuperator valve would probably have attained 1,000° F., creating problems with its lubrication and with any associated seals. The second stage external tubular recuperator connecting the cylinder heads was of considerable length and presented a large area for loss of heat to the atmosphere instead of retention in the next cycle. Place's patent indicates an amazing understanding of the problem when one considers the date of his work.

U.S. Pat. No. 642,176 issued to E. Thomson describes a two cylinder engine with its cylinders interconnected by a recuperator which is not separated from either cylinder by valving. Air is inducted into one cylinder and the other cylinder is filled with a fuel-air mixture. The fuel-air mixture is inducted into the cylinder containing air via the recuperator and is ignited during passage through the recuperator. Exhaust is released from each cylinder directly to the atmosphere and not through the recuperator whereby no exhaust heat is recovered.

U.S. Pat. No. 870,720 issued to A. J. Frith describes a two cylinder engine with the cylinders coupled by a recuperator as in the device of Thomsom without the isolation from either cylinder by valving. This engine suffers from the same deficiency as the engine of Thomson, in that exhaust is transferred to a cylinder and released directly to atmosphere without passing through the recuperator as is needed for maximum recovery of thermal energy. Additionally, the inventor teaches that the air should be saturated with water prior to compression and passage through the recuperator to the other cylinder. The presence of water vapor will lower the temperature of the recuperator and further reduce the Carnot efficiency.

In U.S. Pat. No. 1,111,841 issued to J. Koenig and U.S. Pat. No. 1,904,070 issued to J. D. Morgan, both inventors have the similar idea of cooling compressed air followed by heating the air in a recuperator. This method of operation does not make full use of the high value thermal energy of the exhaust since cooled compressed air sent through the recuperator must result in a lower temperature of the output gas and must therefore reduce the maximum attainable working temperature in the engine. Thus, the Carnot efficiency of the engines of each of these two inventions is less than that which is desired and is believed to be attainable in a properly engineered internal combustion engine.

In United Kingdom patent 528,391 issued 10/1940 to Michael Martinka there is described an engine having a regenerative heat-exchanger mounted movably within the combustion chamber and thus exposed to the combustion gases.

In United Kingdom patent 640,410 issued 7/1950 to Isaac Lubbock and R. Rigby and assigned to Shell Refining and Marketing Co. Ltd. there is described an engine having a regenerator fixed in the combustion chamber, or alternatively fixed to the head of the piston, and in either case exposed to the combustion gases.

In United Kingdom patent 761,122 issued 11/1956 to Richard Rigby and assigned to Shell Refining and Marketing Co. Ltd., an engine is described having a regenerator in the cylinder and attached to a movable sleeve. Another engine is described having a regenerator fixed in a cylinder between two reciprocating pistons. In each case the regenerator is exposed to the combustion process which is generally above the temperature tolerance of known regenerator elements.

In Swiss patent 307,098 issued 5/1955 to J. H. Keller and assigned to N. V. Machinefabriek en Reparatiebedrijf describes an engine having a multistage, intercooled compressor followed by an external regenerator feeding into a combustion/expansion cylinder.

United Kingdom patent 1,308,355 issued 2/1973 to Daimler-Benz Aktiengesellschaft on Feb. 28, 1973 describes an engine having a regenerator located and exposed to combustion between dual opposed pistons. It states that by use of the best heat-resistant materials, the heat exchanger/regenerator may be operated at 1,200° C.

United Kingdom patent 1,440,595 issued 6/1976 to W. C. Pfefferle and assigned to Engelhard Minerals & Chemicals Corporation describes two engines, one having a catalyst member located and exposed to combustion between dual opposed pistons, and a second having a catalyst member located in a combustion chamber above a single piston. U.S. Pat. No. 4,389,983 issued to B. E. Enga et al and assigned to Johnson, Mathey & Co., Ltd teaches a single piston engine having a catalytic unit located in a port connecting the cylinder with a precombustion chamber. In both inventions, temperature tolerance of the catalyst member or catalytic unit places an upper limit on the operating temperature within the combustion chamber.

U.S. Pat. No. 4,040,400 issued to Karl Keiner teaches that the low efficiencies of internal combustion engines are a consequence of the considerable heat losses associated with the expansion of the highly compressed gaseous media and with compression of the combustion supporting air in the cylinder. He proposes to increase efficiency by compressing the air charge in a cooled multistage reciprocating compressor which has recoolers between its discrete compression stages. He characterizes this type of cooled compression as being substantially isothermal. Once the air has been compressed it is heated by exhaust gases by passage through a coiled pipe in a chamber containing exhaust gas prior to mixture with fuel-air mixture during passage through a nozzle which imparts a whirl to the gases and causes self ignition. It is stated that super heated steam can be added to the compressed air or to the fuel-air mixture to prevent over heating in the combustion chamber. This combustion chamber being a part of the cylinder head that is open to, but thermally insulated from, the cylinder and above the top dead center of the reciprocating working piston. It is difficult to envision an increased Carnot efficiency when heat and shaft work is expended in the compression process and the maximum temperature of the combustion is deliberately lowered "to prevent overheating".

U.S. Pat. No. 4,074,533 issued to Thomas R. Stockton and assigned to the Ford Motor Company discloses three working cylinders interconnected by valved ducting to allow gas flow through all three cylinders in series. The middle cylinder in the series receives fuel above and displaced from a regenerator modified to act as a catalytic combustor. Greater efficiency would be realized if there were only one cylinder operating as a two stroke engine. Excessive pumping from one cylinder to another seems to be wasteful of useful work.

U.S. Pat. No. 4,133,172 issued to Roy S. Cataldo and assigned to General Motors Corporation teaches the use of interconnected piston-cylinder arrangements for compression and expansion of the working fluid with an exhaust heat recuperator and combustor positioned in series between the compression and expansion cylinder, wherein the gases discharged from the expansion cylinder flow to exhaust through the recuperator. It would appear from the two figures of the drawing that the air being heated by the recuperator passes through it at right angle to the direction of flow of the exhaust gases. Such arrangement would reduce the ability of the recuperator to effect maximum heating of the compressed air charge. In any event, the location of the recuperator and the combustor in an external uninsulated duct extending between the two cylinder heads of a Vee-engine presents a large surface for thermal convection and radiation losses to degrade the high temperature thermal energy available from the exhaust, while the occurrence of combustion adjacent the exposed recuperator would lead to deterioration of the element.

U.S. Pat. No. 4,630,447 issued to William T. Webber describes, as was also done by Thomson and by Frith, an engine having two cylinders coupled by a recuperator without separation from either cylinder by valving. Air inducted into the cold cylinder is compressed, passed through the recuperator into the hot side, mixed with fuel, combusted, expanded, and passed through the recuperator for further expansion in the cold cylinder, and then exhausted to atmosphere without passing through the recuperator. As with Thomson and Frith, Webber's engine suffers from potential degradation of the recuperator due to its direct exposure to combustion, as well as loss of thermal energy with the exhaust.

U.S. Pat. No. 4,715,326 issued to Robert H. Thring is the first of three patents to Thring in a span of nine years. The others are U.S. Pat. No. 5,050,570 and U.S. Pat. No. 5,499,605. All three patents are concerned with internal combustion engines that each contain a means for the recuperative recovery of heat from the exhaust for reuse in heating the working charge. In each of the patents the recuperator is situated in an exposed duct where radiation and convection losses will reduce the maximum temperature attainable with a consequent reduction in the Carnot efficiency.

U.S. Pat. No. 4,781,155 was issued to Helmut G. Brucker for an engine having a supercharger cylinder and a combustion cylinder connected by a duct wherein a regenerator is situated. This engine suffers from the same deficiency as the others where the regenerator is subject to heat loss because no provision has been made to minimize convection and radiation losses.

U.S. Pat. No. 5,085,179 issued to Henry B. Faulkner and assigned to Ingersoll-Rand Company teaches the uses of thermal recuperation in the same manner as U.S. Pat. No. 4,781,155 and suffers the same deficiencies.

U.S. Pat. No. 5,228,415 issued to Thomas E. Williams employs a shell and tube heat exchanger to extract heat from the exhaust and transfer it to the compressed air charge while the air is in transit from a compression cylinder to a combustion cylinder. The shell and tube heat exchanger acts as a recuperator but is less efficient and unless provided with heavy insulation, is not as efficient as a recuperator of the type having a hot end and a cold end.

One solution to the exhaust waste problem has been the turbo-expansive conversion of exhaust energy to rotative energy. Typically the rotative energy is used to drive a turbo-compressor for boosting input air pressure to the engine. Turbines however are not well suited to the pulsating exhaust flow from a single cylinder nor can they tolerate the aforementioned high temperature gas released at the exhaust valve of the Otto engine. For this reason, exhaust is generally collected from several cylinders through exposed pipes which moderate the pulsations and cool the gas to 1,400° F. or lower before it enters the turbine. Such cooling wastes the bulk of the potential energy to the atmosphere and for this reason, exhaust turbines have not been particularly effective for raising the efficiency of Otto engines.

Another solution to the exhaust waste problem and one been put into extensive practice has been the turbo-expansive conversion of exhaust energy to rotative energy. Typically the rotative energy obtained from waste exhaust is used to drive a turbo-compressor for boosting input air pressure to the engine. Turbines are not well suited however to the pulsating exhaust flow from a single cylinder. They also cannot tolerate the high temperature gas released at the exhaust valve of the Otto engine. For this reason, exhaust is generally collected from several cylinders through exposed pipes which moderate the pulsations and cool the gas to 1,400° F. or lower before it enters the turbine. Such cooling wastes the bulk of the potential energy to the atmosphere and for this reason, exhaust turbines have not been particularly effective for raising the efficiency of Otto engines.

A large amount of art was also found on a group of heat engines having recuperators for internal heat exchange, but with external combustion wherein combustion heat is passed through a working chamber wall to enter the working gas.

The problem with most of these cited internal combustion engines employing a heat exchanger or recuperator of one type or another is the large radiative and convective heat loss caused by the exposed location and the large surface area of the heat exchanging element. As pointed out in the discussion of individual patents, heat losses from the recuperator lower the Carnot efficiency. In the very few instances in the prior art where the recuperator is not subject to radiation and convection losses, the recuperator is located in the working cylinder or located in an internal duct that is directly connected with and open to the working cylinder. This means that the recuperator or equivalent is directly exposed to the flame front of the ignited charge, with a consequent shortening of its useful life.

SUMMARY OF THE INVENTION

Present day automotive engines and the like (referred to herein as Otto engines) have spark ignition and burn gasoline fuel, with compression/expansion ratios typically limited to around 8:1 to avoid detonation, pre-ignition, and weight penalties from peak cylinder pressures. With this ratio, expansion of the combustion gases is far from complete, however, and as a result, exhaust gases are released at about 100 psi and a temperature of 2,500 to 3,200° F. The exhaust at these pressures and temperatures still contains about half of the input fuel energy and thus the Otto cycle loses this energy to the atmosphere.

Intermediate between the Otto and the Diesel there has remained the possibility of an engine type which would extract more energy from the combustion gas but without the weight and cost penalties of the Diesel. A direct approach has been to capture heat from the exhaust and put it back into a subsequent engine cycle. This process of recovering heat has been referred to in the prior art as regeneration, heat exchanging, heat recycling and recuperation.

For brevity, the heat exchanging cycle will be called a Hx cycle (pronounced "wix"). The term "recuperation" and "recuperator" will be used herein and such recuperation is believed to be most effective when the recovered heat is put into the charge after the charge is trapped and fully compressed within the engine's working chambers. The term "charge" will also be applied herein to mean interchangeably both the air charge and the fuel-air charge since it has now become common practice with engines to inject fuel at almost any point along the air flow path between the air filter and the combustion chamber at the instant of ignition.

Many engines which apply captured heat to the charge prior to enclosure behind an inlet valve are not considered recuperative since the heat is applied prior to charge entrapment. Such heating can improve vaporization of fuel in the Otto or improve cold starting in a Diesel, but it cannot otherwise raise the thermal efficiency of the cycle. To raise efficiency, captured heat must be returned to a point within the gas cycle.

In the prior art, recuperative engines have generally had adequate recovery of exhaust heat but their transfer of this heat to the working charge has been inefficient. This is because the high temperature and what is termed "high grade" thermal energy available in and recovered from the exhaust has been allowed to dissipate by escaping to the environment, thus leaving only a fraction of the available energy for transfer to the working charge. Early inventors of heat engines sought effective use of recuperators, but often compromised thermal efficiency by reducing temperatures either to protect working materials and surfaces or to avoid problems with detonation or pre-ignition in the heated combustion gases.

A recuperative or heat exchanging cycle, referred to hereinafter as the Hx Cycle (pronounced "wix") will be used to refer to the operating cycle of an engine that captures heat from its exhaust and transfers the heat to a subsequent compressed charge.

The maximum efficiency, $\eta_o$ possible in a heat engine operating on the Otto Cycle engine is calculable by Carnot's Law which, in one form, states:

$$\text{Max. possible Otto Cycle efficiency, } \eta_o = 1 - \frac{T_{Low}}{T_{High}}$$

the above equation is the exhaust temperature at the instant of release, $T_{High}$ is the combustion temperature at the beginning of expansion, and all temperatures are measured on an absolute temperature scale such as the Rankine, based upon Fahrenheit units. The maximum possible efficiency, $\eta_{Hx}$, of the Hx Cycle, where $\Delta T_{rec}$ is the reduction achieved in the engine exhaust temperature by the recuperator, is:

$$\text{Max. possible Hx Cycle efficiency, } \eta_{Hx} = 1 - \frac{T_{Low} - \Delta T_{rec}}{T_{High} - \Delta T_{rec}}$$

Putting in typical temperatures in degrees Rankine for a Hx Cycle recuperative engine at peak output, we get:

$$\text{Maximum efficiency, } \eta_{Hx} = 1 - \left(\frac{3{,}000 - 600}{5{,}500 + 600}\right) = .606$$

For the Otto Cycle engine, the maximum possible efficiency is:

$$\text{Maximum efficiency, } \eta_O = 1 - \left(\frac{3{,}000}{5{,}500}\right) = .455$$

Thus, in this ideal case, six hundred degrees of recuperation effects a one-third increase in potential efficiency. It must be understood though that these equations are approximate since several loss factors have not been included. These factors include:

a) primary heat loss, primarily during and just subsequent to combustion, to the walls of the combustion chamber, the walls of the expander cylinder, the head of the piston;

b) secondary heat loss to the containing wall of the recuperator;

c) gas flow losses during the transfer of compressed air from the compressor through the duct and the recuperator to the combustion chamber;

d) gas flow losses during the expulsion of exhaust through the recuperator to atmosphere.

Primary heat loss a) occurs in Otto engines as well as in the recuperative engine. A comparison between equations for efficiency with and without recuperation are therefore essentially valid without considering primary heat loss. Secondary heat loss b) is peculiar to the recuperative engine appears as a loss in recuperator efficiency.

Flow losses c) are a strong function of:

the geometry, diameter, and length of the transfer duct;

the design of the transfer valve;

the design of the recuperator;

the volume of gas to be transferred;

and the time available for compressed gas transfer (in the range of a few milliseconds).

To keep flow losses small, calculated flow velocity through the transfer duct should be kept 25 to 40% below the speed of sound. Due to the rapid rise of gas viscosity with temperature (an increase of about 2.5 times between room temperature and peak combustion temperature), passages must be made larger for higher temperature gas flow. Gas temperatures can be estimated accurately well by extrapolation from conventional Otto engine data.

Today's automotive Otto engines typically operate at 2,400 to 3,200 RPM. Up to this RPM range in the recuperative engine, flow losses are not excessive and are expected to cancel only a small part of the recuperative gain. Gas flow losses for air transfer through the recuperator, and exhaust blowdown and expulsion through the recuperator occur only in the recuperative engine. Thus the equations given indicate an optimistic advantage for the recuperative engine Ignition delay creates another potential energy loss in the recuperative engine. This delay, as defined herein, is the total period measured either in degrees rotation of the crankshaft or in milliseconds of time between when the spark occurs and when combustion pressure goes through a peak. In a typical modem V-8 automotive engine with compression ratio of 8:1 and running at 3,000 rpm under 50% load on regular 87 octane fuel, optimum spark advance is around 30 crankshaft degrees before top dead center. If peak pressure occurs at 10 degrees past top dead center, then the ignition delay in this engine is 40 crank degrees or 2.2 milliseconds.

Since the recuperative engine performs extra functions just prior to ignition which functions do not occur in the Otto, it is important that the recuperative engine have less delay than an Otto engine. These extra functions in the recuperative engine are:

a) the transfer of compressed air from the compressor through the recuperator to the combustion chamber, b) the closing of the recuperator valve to seal the compressed air into the combustion chamber, and c) the injection of fuel into the compressed air.

These functions overlap somewhat in time, making the total delay less than the sum of the parts.

Ignition delay can be reduced in several ways. These include increasing the temperature of the fuel-air mixture, increasing turbulence or thoroughness of mixing, increasing the pressure, increasing the wall temperature, reducing the octane rating of the fuel (low octanes igniting faster), and by varying the type of fuel. Fuels such as hydrogen and acetylene with lightweight molecules exhibit higher flame speed and less ignition delay. Gasoline has a slow flame speed by comparison, the higher octane fuels being purposely slowed to reduce the propensity to pre-ignite and to detonate. Fuels other than gasoline may actually yield higher efficiency in the recuperative engine.

The recuperative engine invention herein benefits from reduced ignition delay. Satisfactory operation has been obtained at 960 to 980 RPM on gasoline. Reduced ignition delay (higher flame speed) can be obtained of course by using fuels other than gasoline. Two factors work to reduce ignition delay in the recuperative engine herein, namely the high temperature of the mixture and the high temperature walls of the combustion chamber as compared with the typical modem Otto engine.

The losses are also affected by the strong variation of specific heat with temperature for the input air and combustion product gases (primarily nitrogen) wherein the gas specific heat at combustion temperature is over twice what it is at room temperature. This variation in specific heat necessitates a correction factor for $\Delta T_{rec}$ (temperature recuperated) whereby the $\Delta T_{Ex}$ (the reduction in exhaust temperature) which is obtained is less than the $\Delta T_{CA}$ (increase in compressed air temperature) which occurs using heat received from the exhaust, if one assumes that the recuperator is perfect and that no heat is lost to the surroundings.

The aforementioned problems of Otto and Diesel engines and known recuperative engines of the prior art are solved by my invention wherein I provide the combination of a new and novel recuperative cylinder head with a two cylinder engine, which two cylinders comprise a compressor and an expander. The cylinder head contains a compact internal recuperator having a volume in the range of 2 to 10 per cent of the volume of the inducted air charge, this volume being preferably made as small as possible. The recuperator is adjacent to the combustion chamber and efficiently coupled at its hot end to the chamber for gas flow communication by a recuperator protective valve. An exhaust valve is located at the opposite end or cool end of the recuperator for releasing exhaust to the atmosphere.

It must be mentioned here that the two-cylinder engine represents the basic unit of this invention, one cylinder being employed for induction and compression of ambient air and the other cylinder being used to receive compressed air and fuel, combust and expand the mixture, and then exhaust it.

This basic unit is a two-stroke wherein it fires once for each revolution of its crankshaft, but without suffering any of the drawbacks of the common two-stroke having a single piston. This recuperative dual piston two stroke is thus quite suitable for low power utility applications such as garden tractors, lawn mowers, all terain vehicles, outboard motors, chain saws and the like. For use in automobiles, from two to six or even more such units may be ganged together in a common engine block to produce the equivalent of a modern day four to twelve cylinder four-stroke Otto engine.

During operation of the engine, a charge of air is first inducted, then it is compressed and thereby adiabatically heated in a compression cylinder, then passed through the recuperator for second stage heating from recovered exhaust heat. While this second heating may seem of little consequence, it has been found to be simple to realize over 600 degrees Fahrenheit of heating in an engine running at 1,000 rpm. The doubly heated air is then passed directly into the combustion chamber where fuel is injected and the mixture ignited, while a recuperator protective valve closes behind it to isolate the recuperator from the combustion chamber to avoid the life shortening of the recuperator through exposure to the flaming fuel-air mixture. The combustion gases are then expanded against the expander piston to produce work to a volume which for highest efficiency and dependent upon the design of the engine, may be in the range of 50 to 150% larger than the ambient volume of the inducted air charge. For higher power and a smaller boost in efficiency over an Otto engine, the expander may have a volume approximately equal to the displacement of the compressor.

After expansion in the cylinder and during the exhaust phase, hot waste gases are passed in the opposite direction through the combustion chamber, valve, and recuperator, thus providing a counterflow and giving up the bulk of their heat to interior components of the engine and then to the recuperator elements and catalytic elements if included, thereby providing an optimal mode for transferring heat from the exhaust to the next compressed charge.

The topology of the recuperator is such that refractory thermal insulation may be easily provided to enclose and align the high temperature valves and the recuperator and catalytic elements. This arrangement of combustion chamber, recuperator, protective valve, and insulation greatly reduces heat losses caused by radiation and convection and obtains improved Carnot efficiency in a simple, cost effective, practical manner.

BRIEF DESCRIPTION OF THE DRAWING FIGURES

In order that the invention may be clearly understood and readily carried into effect, reference will now be made, by way of example, to the accompanying drawings, in which.

DETAILED DESCRIPTION OF THE INVENTION

A clear and better understanding of my invention can be had by reference to this description when taken together with the appended drawing, wherein like reference indicia refer to like elements of the invention.

Figure 1:
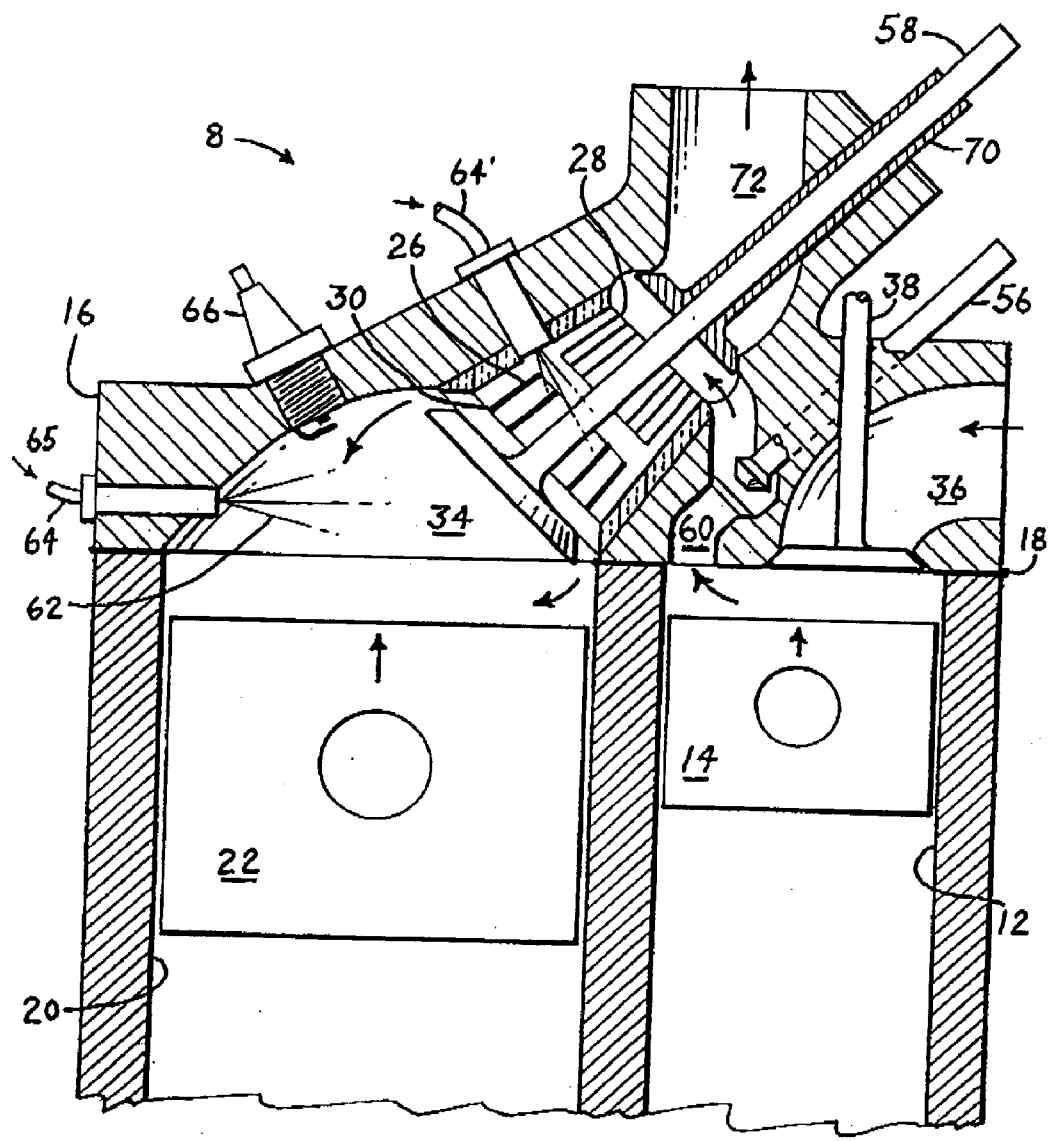
FIG. 1 is a sectional view of a recuperative engine operable on a two-stroke cycle and having dual pistons and a common duct recuperator.

In the embodiment of the engine 8 shown in FIG. 1, a compressor piston 14 and an expander piston 22 operate in adjacent compressor cylinder 12 and expander cylinder 20, and a recuperative cylinder head 16 is attached to and encloses the open ends of both cylinders. Recuperator 26 and combustion chamber 34 are built into cylinder head 16, which also defines an intake port 36 containing an intake valve 38 to admit ambient air into compressor cylinder 12, a transfer duct 60 to pass compressed air from compressor cylinder 12 into recuperator 26, and a recuperator valve 58 to control the flow of compressed air from recuperator 26 to combustion chamber 34. Fuel injector 64 admixes fuel with the compressed air flow as it flows through recuperator 26 at a point close to the combustion chamber end of recuperator 26 where the recuperator temperature is hot enough to prevent buildup of deposits from the fuel. Ignition of the fuel-air mixture within combustion chamber 34 is provided by spark plug 66.

After combustion in chamber 34 and expansion of the gases against piston 22, recuperator valve and exhaust valve 70 open to release exhaust from cylinder 20 to flow through recuperator 26 past exhaust valve 70 and through exhaust duct 72 to the atmosphere.

In this embodiment of the engine, recuperator 26 may be described as common-duct since the exhaust gas and the air charge both flow through the same duct of the recuperator. However these flows occur at alternate times and flow in opposing directions, thereby effecting counter-current flow which is the most efficient arrangement.

Recuperator 26 has a hot end 30 adjacent to the combustion chamber. The engine must accordingly be controlled by limiting air and fuel input to avoid exceeding temperatures and oxidizing atmospheres at this hot end 30 above the tolerance of available materials, a limit presently around 2,000° F. for refractory metal alloys. Hot end 30 will assume a temperature midway between the peak temperature of the exhaust as it leaves the combustion chamber and the peak temperature of the compressed air as it enters the combustion chamber. Thus the exhaust gas can exit the cylinder at a mean temperature considerably above 2,000° F.

Cool end 28 of recuperator 26 adjacent to the exhaust valve operates substantially cooler at about 800° F. During operation, these temperatures are higher when the engine is at fall load and high RPM, and lower when the engine is at minimum load and at low RPM.

In addition, exhaust gas temperature will rise when the fuel input is reduced to make the fuel-air mixture lean and above stoichiometric. Lean mixtures burn at reduced speed whereby burning may continue down into the expansion stroke causing exhaust to exit at higher temperature and containing free oxygen. Overly lean operation may thus be detrimental to the recuperator as well as to the engine efficiency due to the combination of higher temperature and the oxygen presence which may oxidize the recuperator elements.

In this recuperative engine, the final exhaust leaving the recuperator, even after having had 600 Fahrenheit degrees of thermal energy removed, will still contain recoverable thermal and expansive energy. The gas temperature is now low enough however to directly drive a turbine at good efficiency. This is particularly if the engine has multiple units so that the pulsating exhausts may be merged and smoothed before entry to the turbine. The rotative power from the turbine may be efficiently converted to electric power by an AC alternator, which electric power is needed in most engine applications.

Figure 2:
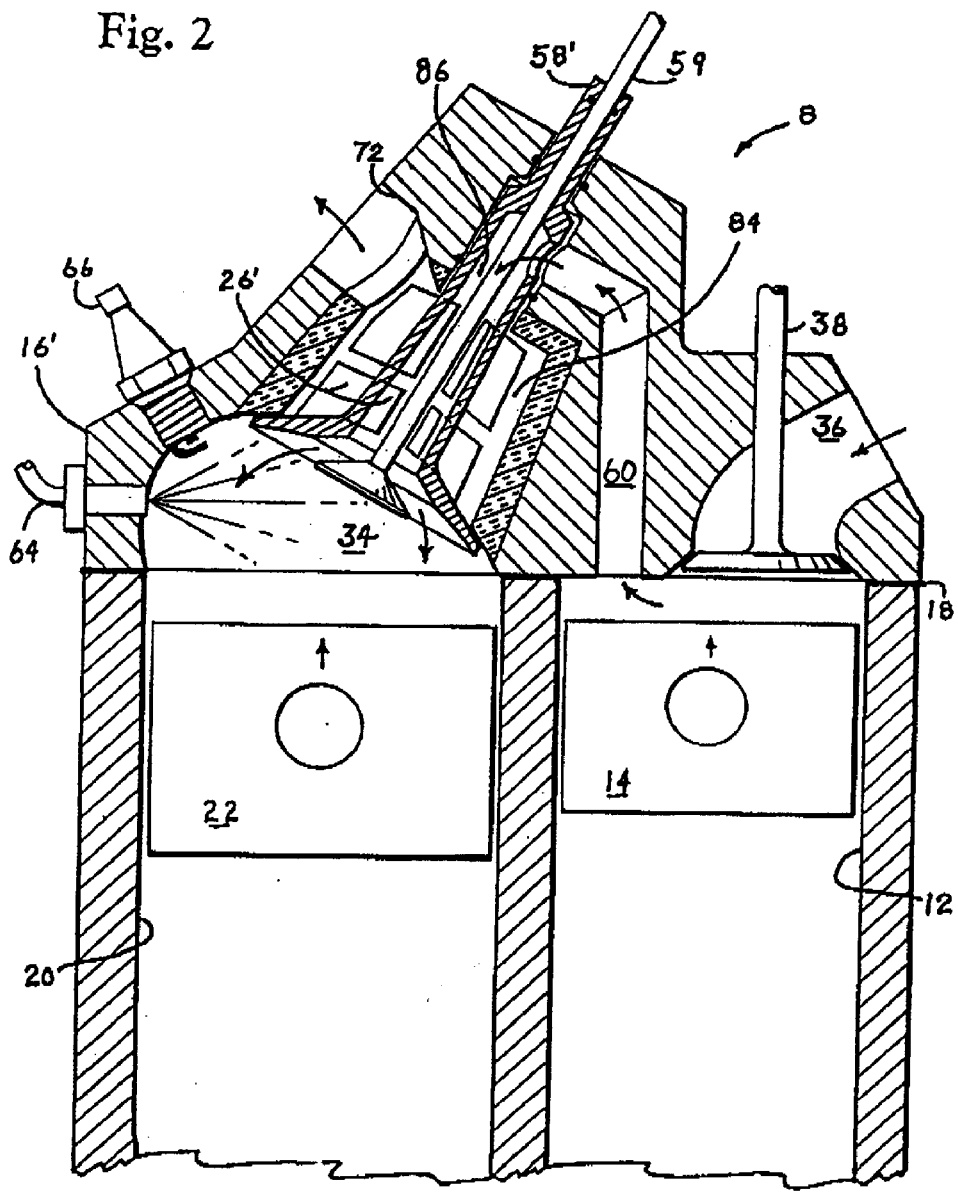
FIG. 2 is a sectional view of another embodiment of a recuperative engine operable on a two-stroke cycle and having dual pistons, a separated duct recuperator, and a combustion chamber defined primarily by the cylinder head.
Figure 3:
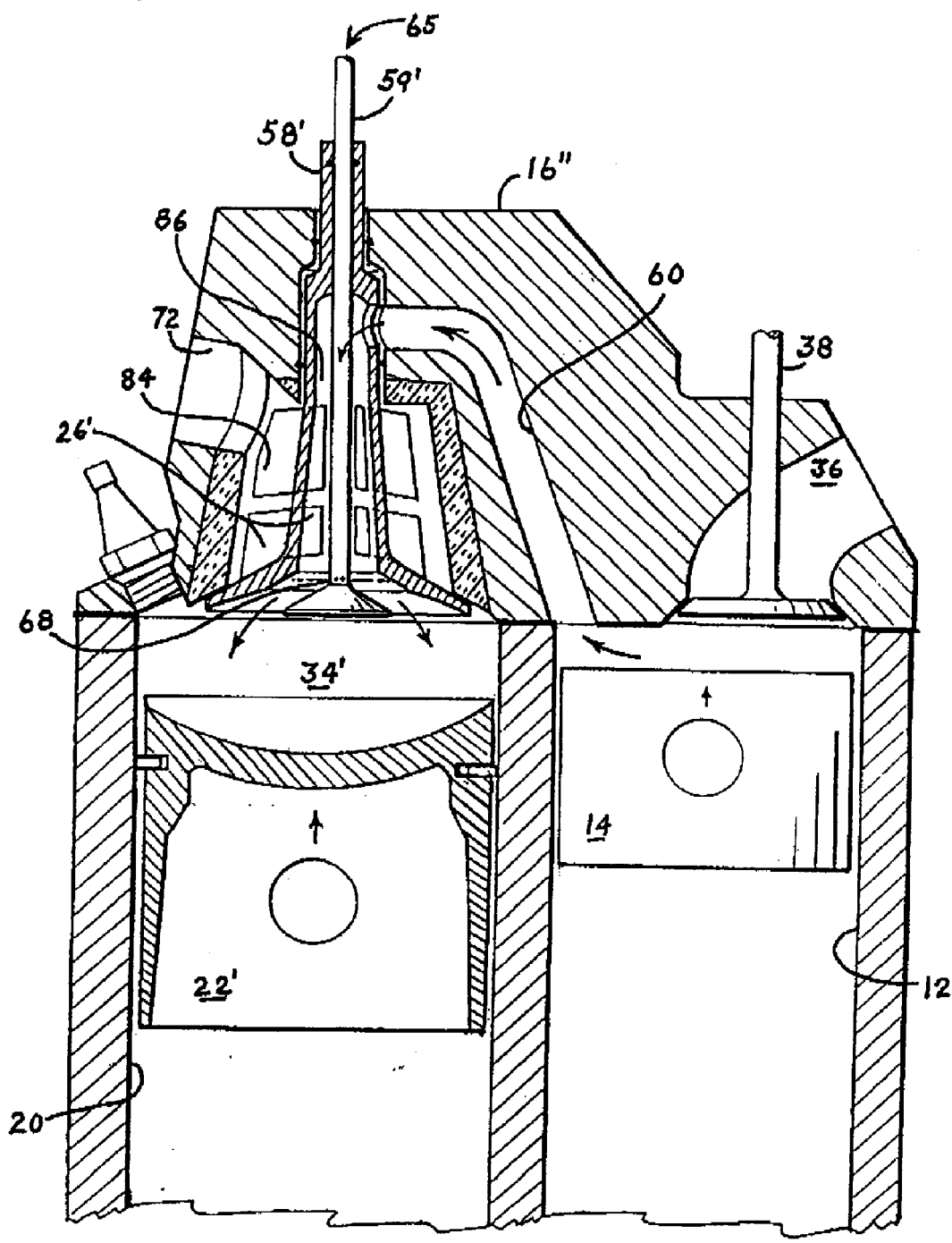
FIG. 3 is a sectional view of a preferred embodiment of the recuperative engine operable on a two-stroke cycle and having a separated duct recuperator and a combustion chamber located in and defined primarily by the head of the expander piston.
Figure 4:
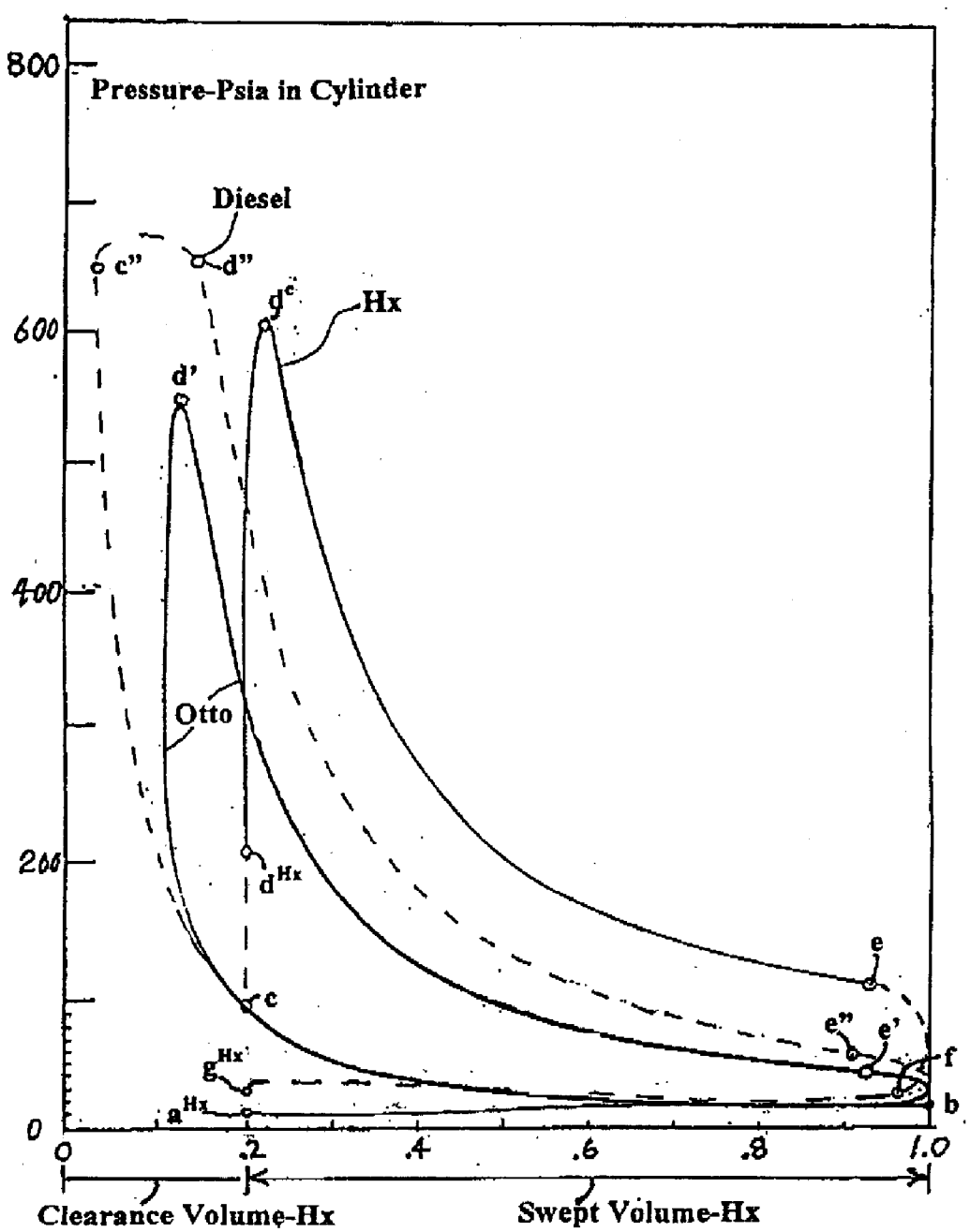
FIG. 4 is a linear pressure vs. volume graph comparing the Hx, Otto and Diesel cycles.

The common duct recuperator 26 in FIG. 1 will normally have higher heat transfer efficiency than the separated duct recuperator in FIGS. 2 and 3. This occurs because of greater temperature difference that occurs in the separated duct geometry. Heat captured by the surface of an element in the common duct can transfer directly back from the surface to the compressed air flow in the next phase of the cycle. In the separated duct recuperator, the heat must transfer through the body of an element from the exhaust duct to the air duct and then transfer to the compressed air. This extended path in the separated duct recuperator will cause additional temperature drop between the exhaust flow and the compressed air flow.

Other differences between the common duct end the separated duct recuperative engine are that the embodiment of FIG. 1 uses four valves for the basic engine unit. The separated duct embodiment of FIGS. 2 and 3 requires only three valve per basic unit, each duct may be optimized for its gas flow requirements, and no compressed air is lost as it travels from the compressor towards the combustion chamber.

It should be understood that FIG. 1 does not show standard components of an internal combustion engine except for those which are essential for an understanding of my invention. Thus, there is no illustration of a crankshaft, or a connecting rod, or a cam shaft to actuate the four valves 38, 56, 58, and 70. Those of normal skill in the art of internal combustion engines will have no difficulty in applying their knowledge to mentally supply these standard components which were not included in the drawing.

Those same persons of normal skill in the art will appreciate the fact that inlet valve 38 obtrudes inlet port 36 and serves to selectively control ambient air intake to compressor cylinder 12.

Turning now to FIG. 2, there is a second embodiment of my invention. A compressor piston 14 and an expander piston 22 operate in adjacent compressor cylinder 12 and expander cylinder 20, and a recuperative cylinder head 16' is attached to and encloses the open ends of the cylinders. In addition to the recuperator 26 and combustion chamber 34, there are built into the cylinder head 16' an intake port 36 and an intake valve 38 to admit air into compressor cylinder 12, a transfer duct 60 to pass compressed air from compressor cylinder 12 into recuperator 26, and a recuperator valve 58' to allow the compressed air to pass from the recuperator 26 to the combustion chamber 34 through internal duct 86. Recuperator 26 has separated ducts, which describes a construction wherein the exhaust and the air charge pass through the recuperator in adjacent but separate ducts 84 and 86. Joint 18 allows one to connect cylinder head 16 to cylinder block containing cylinders 12 and 20.

A fuel injector 64 is illustrated to admix fuel with the compressed air flows through recuperator 26 and at a point where recuperator 26 is hot enough to prevent buildup of deposits from the fuel. Ignition of the fuel-air mixture within combustion chamber 34 is provided by spark plug 66.

After combustion in chamber 34 and expansion of the gases against piston 22, recuperator valve 58' and exhaust valve 70 open to release exhaust from cylinder 20 to flow through seperate ducts 84 of the recuperator 26 past exhaust valve 70 and through exhaust duct 72 to the atmosphere.

This engine has the advantages of having only three valves for two cylinders. There is almost no loss of compressed air in the transfer duct 60. The low volume of air duct 60 means that the air has only a low loss of compression as it travels through the duct. Each duct inside recuperator 26 can be optimized for gas flow volume and viscosity by designing appropriately. The exhaust duct can hold a large volume of hot ambient gases before they are expelled to the outside.

FIG. 3 is a third embodiment of my invention. It is similar to FIG. 2 except that combustion chamber 34' is defined by the upper end of expander cylinder 12, the head of expander piston 22', and the surface of cylinder head 16'. Recuperator 26, recuperator valve 58", and recuperative exhaust valve 70' are arranged in a position approximately coaxial with and above expander cylinder 20. Fuel is fed in through a hollow stem of recuperator valve 58" and injected through atomization means under the head of valve 58", whereby atomized fuel is admixed with the compressed air as the air enters combustion chamber 34'.

OPERATION OF THE INVENTION

Figure 5:
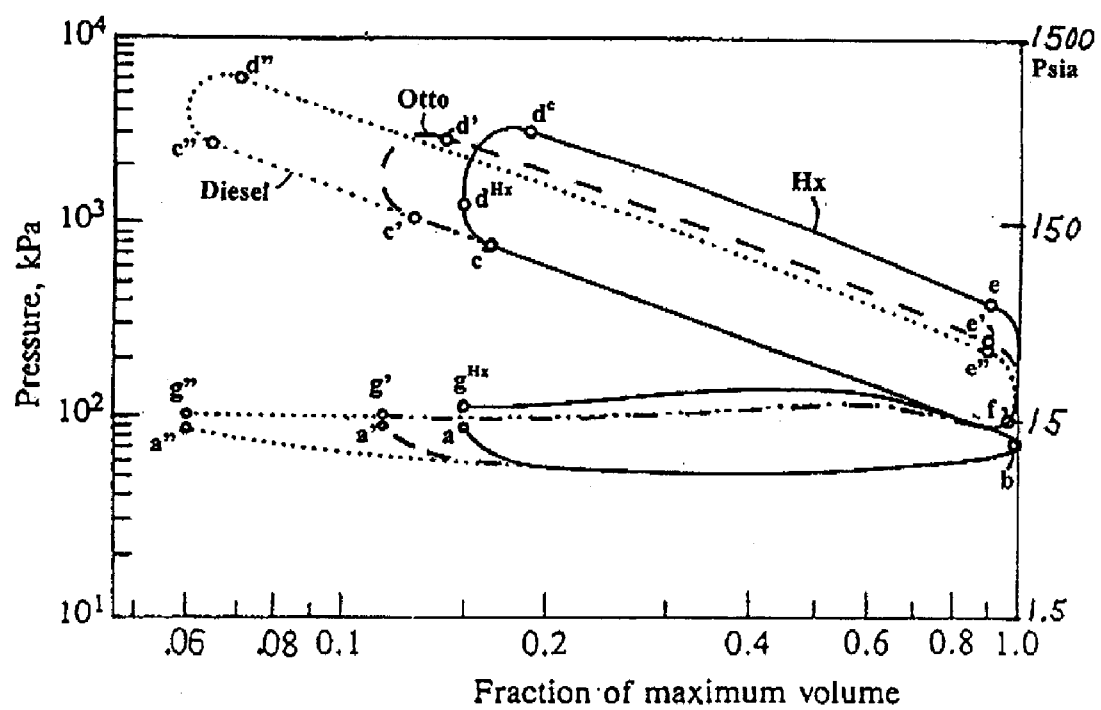
FIG. 5 is a log pressure vs. log volume graph comparing the Hx, Otto and Diesel cycles.

To develop the recuperative cylinder head, a series of nine prototypes were built and tested, the last of which is a dual piston embodiment effectively as illustrated in FIG. 5. A Ford 4 cylinder Pinto 2.0 liter engine block was used as the basic test engine. Cylinders 1 and 4 were blanked off and not used other than for mechanical balance and cylinders 2 and 3 were used for the compressor and the combustor cylinders. The phasing of the compressor and combustor cylinders were left in phase; that is, the compressor and the combustor pistons moved in synchronism. By putting a twist in the crankshaft, of course, one could easily build into the engine any desired phase difference between the compressor and combustor pistons. It is believed that a phase lead of the compressor of about 15 degrees over the combustor may be advantageous for an engine designed to run in the 500 to 2,000 RPM range while for higher speed, a larger phase advance would be optimal. The compressor and the combustor cylinders were left at their basic displacement of approximately 30 cubic inches, each.

A recuperator duct having an internal gas volume of one-fifteenth of the cylinder displacement (approximately 2 cubic inches) was built into the recuperative cylinder head between the cylinders, and a metal helix was fixed in place in this duct to serve as the recuperator element. An inlet duct was built into the cylinder head to admit an air charge into the compressor cylinder, and a conventional poppet inlet valve was built into the inlet duct to control charge flow through the duct into the compressor cylinder. A much smaller poppet valve, the transfer valve, was built into the head over the compressor cylinder to release charge from the compressor cylinder into a smaller duct which connected with the "cool end" of the aforementioned heat exchanger duct. At this same "cool end" of the recuperator duct, an exhaust valve was placed to release cooled exhaust gases to the atmosphere.

The opposite end of the recuperator duct which I refer to as the "hot end" adjoined a combustion chamber which was also built into the recuperative head, the hot end being fitted with a poppet valve referred to as the recuperator valve that controls the release of heated charge from the recuperator into the combustion chamber and into the cylinder and later in the cycle, controls the release of hot exhaust from the cylinder to pass through the combustion chamber, recuperator valve, and recuperator, and out through the exhaust valve to atmosphere.

Upon startup of the engine in a four-stroke cycle, the recuperator 26, which is initially at ambient temperature, very quickly warms up and after a few dozen engine cycles, approaches a temperature up to as high as 2,000° F. for an engine being run at full throttle. Initial operation of the engine is thus much like that of an engine operating on an Otto cycle but as the recuperator warms up, the engine cycle becomes recuperative.

In a dual piston prototype recuperative engine operable for development purposes in either the recuperative mode or the approximate Otto mode by the insertion or removal of the recuperator, exhaust from recuperative mode operation exits the engine cylinder head as much as 600° F. cooler than it exits when the engine is operated in the Otto mode with the recuperator element removed. With Carnot's Law, this reduction in exhaust temperature implies an improvement in gas cycle efficiency for the recuperative cycle of approximately 30% over the Otto. While operating recuperatively, the fuel-to-air ratio can be leaned significantly more than when operated as an Otto, to an estimated 23:1. The lean burn capability is believed to be due to the higher temperature of the fuel-air charge at the instant of ignition. Exhaust from the engine was also found to be appreciably quieter when it exited through the recuperator.

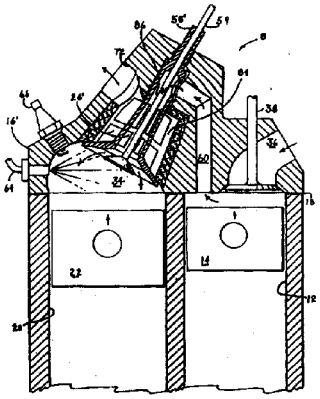

I claim:

1. In an internal combustion engine of the two-stroke type having a compressor cylinder with a compressor piston reciprocating therein between limits defining a top dead center, a bottom dead center, and a working volume therein, and an expander cylinder with an expander piston reciprocating therein between limits defining a top dead center and a bottom dead center, and said compressor and expander pistons reciprocating in said cylinders, the improvement comprising:

inlet means for selectively ambient air into said compressor cylinder;

recuperator means for scavenging thermal energy from exhaust gas flowing in a first direction through said recuperator and being emitted from said expander cylinder in response to a first movement of said expander piston toward said top dead center, and for transferring said thermal energy to a compressed air charge subsequently emitted by said compressor piston during a movement of said compressor of said compressor piston toward said top dead center subsequent to said first movement of said expander piston and flowing in reverse to said first direction through said recuperator;

combustion chamber means for receiving said compressed air charge after said charge has received said thermal energy from said recuperator means and including means for admixing liquid fuel therewith to form a combustible charge and means for igniting same; and cylinder head means for capping said cylinders and for housing said inlet means and said recuperator means and said combustion chamber means; and for insulating said recuperator means to limit thermal energy loss from said recuperator means.

2. The invention of claim 1, wherein said recuperator means is selectively isolated from said combustion chamber means by a recuperator-protective valve and said recuperator-protective valve is opened when said compressed air charge is emitted by said compressor cylinder into said combustion chamber means and closed when said compressed air charge and said admized fuel form a combustible charge and said combustible charge is ignited.

3. The invention is claim 2, wherein the head of said compressor piston and said cylinder head means for capping and cylinders have contours which are complementary and which minimizes the working volume of said compressor cylinder when said compressor piston is at said top dead center.

4. The invention of claim 3, wherein said recuperator means comprises multiple planar elements of a refractory material arranged with an extended planar surface of each of said planar elements defining a common place in a spaced apart array.

5. The invention of claim 4, wherein said recuperator means includes passages for the flow of gases in contacting relationship with said planar elements, said passages having dimensions which are greater in those regions of said recuperator means having higher operating temperatures.

6. The invention of claim 5, wherein said planar elements have at least one radial division to reduce thermal conduction in the direction of decreasing temperature.

7. The invention of claim 6, wherein said planar elements are fabricated from a refractory material that combines high thermal conductivity with resistance to high-temperature deterioration in a oxidizing atmosphere.

8. The invention of claim 7, wherein said recuperator means has a common duct and said exhaust flow passes through said duct in a first direction and said compressed air flow passes through said duct in reverse to said first direction.

9. The invention of claim 7, wherein said recuperator means has a first duct and a second duct which are close thermal relationship and said first duct carries exhaust flow in a first direction and said second duct carries compressed air flow in reverse to said first direction.

10. The invention of claim 7, wherein said means for forming a combustible charge within said combustion chamber comprises at least one direct injection fuel injector for injection into said combustion chamber when said chamber contains said compressed air under high pressure.

11. The invention of claim 10, wherein the gas-accessible volume of said recuperator means plus the gas-accessible volume of said combustion chamber means does not exceed 20% of said working volume.

12. The invention of claim 11, wherein said combustion chamber means for igniting said combustible charge comprises a spark plug.

13. The invention of claim 12, wherein said compressor piston and said expander piston reciprocate with less than 90 degrees difference in phase.

14. The invention of claim 13, wherein said combustion chamber is cavity defined substantially by said cylinder head means.

15. The invention of claim 14, wherein said combustion chamber is a cavity defined substantially by said expander piston.

16. The invention of claim 7, wherein said means for forming a combustible charge within said combustion chamber comprises means for ejecting fuel from said recuperator-protective valve.

17. The invention of claim 7, further comprising transfer valve means for selectively controlling the flow of compressed air from said compressor cylinder to said recuperator means.

18. The invention of claim 8, wherein said recuperator means comprises a multiplicity of helical elements spaced axially along said duct to reduce thermal conduction in the direction of decreasing temperature.

19. An internal combustion engine having a compressor cylinder and an expander cylinder with pistons reciprocating therein between a top dead center and a bottom dead center position within 90 degrees of each other in phase and comprising:

a cylinder head enclosing a working end of said cylinders and providing minimal clearance volume over the piston of said compressor and providing a combustion chamber over and open to said expander cylinder and piston having;

a recuperator internal to said cylinder head, said recuperator being coupled to said combustion chamber;

a recuperator-protective valve for the control of gas flow between said recuperator and said combustion chamber;

an inlet duct defined by said cylinder head, said duct having an inlet valve to selectively control flows of ambient air into said compressor cylinder;

a transfer duct defined by said cylinder head to provide for passage of compressed air from said compressor cylinder to said recuperator;

a fuel injector for admixing fuel with said compressed air to form a combustible charge;

a spark plug for igniting said combustible charge within said combustion chamber; and an exhaust valve to selectively release expanded combustion products to the atmosphere from said recuperator.

20. An internal combustion engine as in claim 19, wherein said engine operates on a two-stroke cycle comprising:

induction of ambient air into said compressor on a first stroke of said compressor piston;

compression of said air during a major portion of a second stroke of said compressor piston;

transfer of said compressor air through said recuperator into said combustion chamber during the remainder of said second stroke of said compressor piston;

admixture of fuel with said compressed air to produce a combustible charge and ignition of said combustible charge within said combustion charge to produce gaseous ignition products;

generation of work from expansion of said gaseous ignitioin products against a first stroke of the expander piston; and exhaust of said gaseous ignition products through said recuperator on a second stroke of said expander piston.

21. The invention of claim 20 wherein said admixture of fuel is provided by fuel flow ejected from the head of the recuperator valve (58').

22. An internal combustion engine as in claim 19 wherein said admixture of fuel with said compressed air is selectively provided as the compressed air passes through the recuperator.

23. An internal combustion engine as in claim 22 further comprising an additional fuel injector means to admit fuel into the vicinity of said spark plug.

24. An internal combustion as in claim 22 further comprising a valve within said transfer RBB duct for selectively controlling the release of compressed air from said compressor into said recuperator.

25. An internal combustion engine as in claim 22 wherein said expander piston has a displacement in the range of 1.2 to 2.2 times the displacement of said compressor piston.

26. An internal combustion engine as in claim 22, wherein said recuperator is divided into multiple, thermally segregated sections along its axis of gas flow.

27. An internal combustion engine as in claim 22, wherein said recuperator has a cross-sectional area for gas flow that increases toward said combustion chamber.

28. An internal combustion engine as in claim 22 wherein said recuperator valve and said exhaust valve are arranged co-axially with said recuperator.

* * * * *

UNITED STATES PATENT AND TRADEMARK OFFICE
CERTIFICATE OF CORRECTION

PATENT NO.    : 6,314,925 B1
DATED         : November 13, 2001
INVENTOR(S)   : Britton It is certified that error appears in the above-identified patent and that said Letters Patent is hereby corrected as shown below:

The current title page should be replaced, a new title page including an illustrated figure should be substituted therefor.

The drawing sheets consisting of figures 1, 2, 3, 4 & 5 should be added as shown on the attached pages.

Signed and Sealed this

First Day of April, 2003

JAMES E. ROGAN
*Director of the United States Patent and Trademark Office*

(12) United States Patent
Britton

(10) Patent No.: US 6,314,925 B1
(45) Date of Patent: *Nov. 13, 2001

(54) TWO-STROKE INTERNAL COMBUSTION ENGINE WITH RECUPERATOR IN CYLINDER HEAD

(76) Inventor: Richard Berkeley Britton, P.O. Box 7451, Charlottesville, VA (US) 22906

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/110,746

(22) Filed: Jul. 3, 1998

Related U.S. Application Data

(60) Provisional application No. 60/051,714, filed on Jul. 3, 1997.

(51) Int. Cl.[7] .................... F02B 33/22; F02G 5/02; F01K 23/04
(52) U.S. Cl. .................. 123/70 R; 123/543; 123/52.5; 60/604
(58) Field of Search .................. 123/70 R, 543, 123/547, 553, 295, 299, 300, 52.3, 52.5, 48 D, 79 C; 60/620, 604

(56) References Cited

U.S. PATENT DOCUMENTS

| | | | |
|---|---|---|---|
| 155,087 | 9/1874 | Hirsch | 60/12 X |
| 328,970 | 10/1885 | Place | 123/68 |
| 642,176 | 1/1900 | Thomson | 123/1 R |
| 870,720 | 11/1907 | Frith | 60/620 |
| 1,111,841 | 9/1914 | Koenig | 123/68 |
| 1,904,070 | 2/1933 | Morgan | 60/620 |
| 3,675,630 * | 7/1972 | Stratton | 123/70 R |
| 4,040,400 | 8/1977 | Keiner | 123/68 |
| 4,074,533 | 2/1978 | Stockton | 60/620 |
| 4,133,172 | 1/1979 | Cataldo | 60/39.63 |
| 4,333,424 * | 6/1982 | McFee | 123/68 |
| 4,630,447 | 12/1986 | Webber | 60/712 |
| 4,715,326 | 12/1987 | Thring | 123/3 |
| 4,781,155 | 11/1988 | Brucker | 123/70 V |
| 4,928,658 * | 5/1990 | Ferrenberg et al. | 123/543 |
| 5,050,570 | 9/1991 | Thring | 123/556 |
| 5,085,179 | 2/1992 | Faulkner | 123/70 R |
| 5,228,415 | 7/1993 | Williams | 123/51 R |
| 5,499,605 | 3/1996 | Thring | 123/70 R |
| 5,782,215 * | 7/1998 | Engelmann | 123/79 C |
| 5,857,436 * | 1/1999 | Chen | 123/70 R |
| 5,927,244 * | 7/1999 | Yamauchi et al. | 123/295 |

* cited by examiner

*Primary Examiner*—Tony M. Argenbright
*Assistant Examiner*—Arnold Castro
(74) *Attorney, Agent, or Firm*—Daniel M. Schaeffer

(57) ABSTRACT

A Recuperative Cycle tow-stroke internal combustion engine having an expander cylinder with an open combustion chamber in its working end and a separate compressor for injecting a compressed air charge into the chamber obtains improved Carnot efficiency by the containment of all its working components in a new and novel cylinder head. This head captures thermal energy normally thrown away in engine exhaust and transfers it advantageously back into the working cycle. The result, long sought by others, has been achieved by incorporating compactly within the head an internal exhaust heat recuperator or heat exchanger closely coupled with a combustion chamber open to the expansion cylinder. A recuperator-protecting valve isolates the recuperator from hot combustion gases until they have been cooled by full piston expansion and a catalytic convertor may be placed in an optimum temperature position within the recuperator chamber. A prototype has demonstrated that the recuperation can reduce exhaust temperature by as much as 600° Rankine below that attainable in an equivalent Otto Cycle engine. The displacement ratio between compressor cylinder and expander cylinder may be optimized during design, such as with a 6:1 compression ratio and a 15:1 expansion ratio, and this feature in combination with the open combustion chamber and the ability to operate the compressor with a phase lead over the expander enables the efficiency to be as much as one-third higher than in an Otto Cycle engine. Recuperators of both common-duct and separated-duct design are described, the latter embodiment being preferred as it provides cleaner burning and a reduction in the number of valves necessary to control gas flow.

28 Claims, 5 Drawing sheets